(No Model.)
M. POTTER.
WRENCH.
No. 341,768. Patented May 11, 1886.
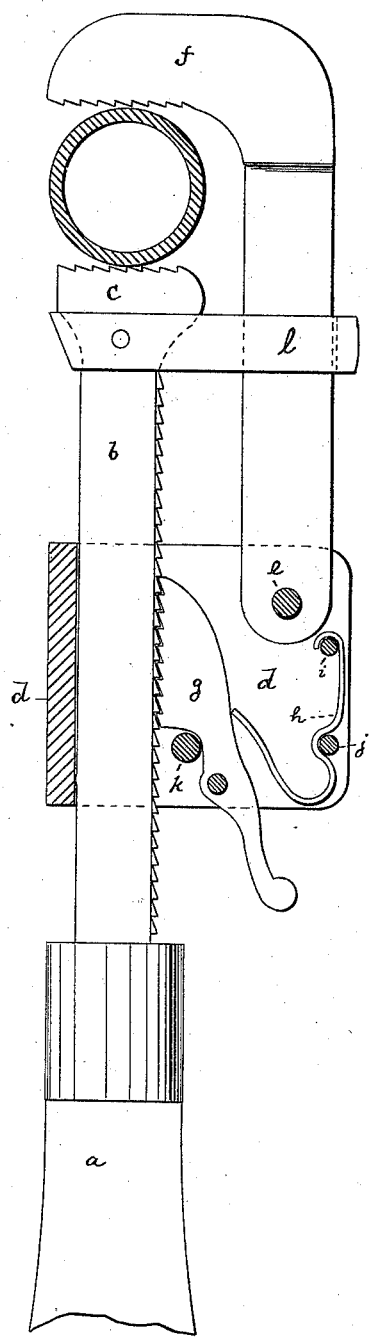
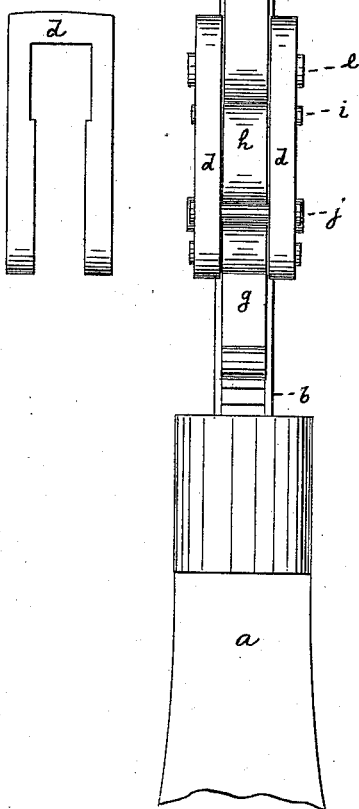
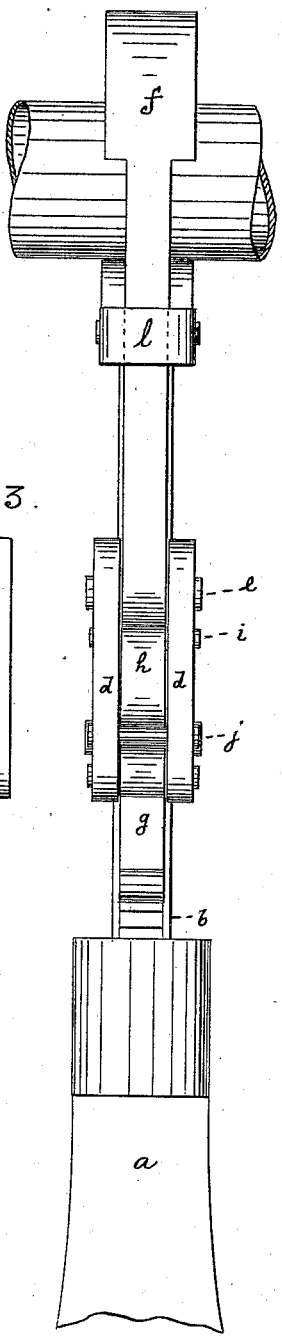
WITNESSES
Wm. H. Lowe
Rob. H. Roy
INVENTOR
Maynes Potter
by his attorneys
Roeder & Briesen

UNITED STATES PATENT OFFICE.

MAYNES POTTER, OF MARINER'S HARBOR, NEW YORK, ASSIGNOR OF ONE-HALF TO WILLIAM V. GULICK, OF ORANGE, NEW JERSEY.

WRENCH.

SPECIFICATION forming part of Letters Patent No. 341,768, dated May 11, 1886.

Application filed September 11, 1885. Serial No. 176,786. (No model.)

*To all whom it may concern:*

Be it known that I, MAYNES POTTER, of Mariner's Harbor, Richmond county, State of New York, have invented a new and Improved Wrench, of which the following specification is a full, clear, and exact description.

This invention relates to a wrench of simple construction, which is easily manipulated.

The invention consists in the elements of construction hereinafter more fully pointed out.

In the accompanying drawings, Figure 1 is a sectional side view of my improved wrench. Fig. 2 is a back view of the same, and Fig. 3 a top view of the sliding frame.

The letter $a$ represents the handle of the wrench.

$b$ is the shank of the fixed jaw $c$, said shank being provided with teeth along one edge to constitute a rack. The rack $b$ is embraced by a U-shaped frame, $d$, free to slide thereon.

Between the two parallel cheek-pieces of frame $d$ there is pivoted at $e$ the shank of the movable jaw $f$.

$g$ is a dog, likewise pivoted between the cheeks of frame $d$, and having a serrated biting-edge to engage rack $b$. A suitable spring, $h$, within frame $d$, bears with its free end against the dog $g$, and tends to hold it against rack $b$. I prefer to make the spring $h$ of the form shown in the drawings—that is to say, it is partly bent around two pins, $i j$, located at opposite sides of the spring.

Below the biting-edge of dog $g$ there is a strong pin, $k$, fitting into a concavity of the dog. This pin is of importance, inasmuch as it bears against the dog when the wrench is used, and takes a large portion of the strain from the pivot of the dog.

$l$ is a yoke pivoted to shank $b$, and embracing the shank of the movable jaw, to properly guide the same.

The operation of the wrench is as follows: To open the same, a handle on dog $g$ is pressed toward the rack $b$, and thus the dog is released from the rack. The frame $d$ and movable jaw $f$ may now be slid up the desired extent. After the work is inserted the dog is released and caused to engage rack $b$ by spring $h$. The movable jaw is now pulled down until the work is tightly clamped between the jaws.

I claim as my invention—

1. The combination of rack $b$ and fixed jaw $c$ with a sliding frame, $d$, to which the shank of movable jaw $f$ is pivoted and containing dog $g$ and spring $h$, and with yoke $l$, pivoted to rack $b$ and embracing the shank of jaw $f$, substantially as specified.

2. The combination of rack $b$, fixed jaw $c$, sliding frame $d$, movable jaw $f$, and dog $g$ with the spring $h$, bent around pins $i j$, located at opposite sides of the spring, substantially as and for the purpose specified.

3. The combination of rack $b$, fixed jaw $c$, sliding frame $d$, movable jaw $f$, and spring $h$ with the dog $g$, pivoted to frame $d$, and with the pin $k$, adapted to bear against the dog, substantially as specified.

MAYNES POTTER.

Witnesses:
W. H. POTTER,
JOHN O'MARA.